(12) United States Patent
Nagori et al.

(10) Patent No.: US 11,688,078 B2
(45) Date of Patent: *Jun. 27, 2023

(54) VIDEO OBJECT DETECTION

(71) Applicant: TEXAS INSTRUMENTS INCORPORATED, Dallas, TX (US)

(72) Inventors: Soyeb Noormohammed Nagori, Bengaluru (IN); Manu Mathew, Bengaluru (IN); Kumar Desappan, Bengaluru (IN); Pramod Kumar Swami, Bengaluru (IN)

(73) Assignee: Texas Instmments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,681

(22) Filed: Nov. 10, 2020

(65) Prior Publication Data

US 2021/0056710 A1    Feb. 25, 2021

Related U.S. Application Data

(63) Continuation of application No. 16/157,861, filed on Oct. 11, 2018, now Pat. No. 10,867,393.

(30) Foreign Application Priority Data

Mar. 22, 2018  (IN) .............................. 201841010577

(51) Int. Cl.
   *G06T 7/00* (2017.01)
   *G06T 7/20* (2017.01)
   *G06T 7/70* (2017.01)

(52) U.S. Cl.
   CPC .................. *G06T 7/20* (2013.01); *G06T 7/70* (2017.01); *G06T 2207/10016* (2013.01)

(58) Field of Classification Search
   CPC ... G06K 9/00; G06K 9/62; G06T 7/20; G06T 7/70; G06T 7/246; G06T 7/11; G06T 7/00; G06T 7/73
   See application file for complete search history.

(56) References Cited

U.S. PATENT DOCUMENTS 9,390,506 B1 * 7/2016 Asvatha Narayanan .................... G06T 7/194
2005/0249426 A1 11/2005 Badawy
(Continued)

OTHER PUBLICATIONS

W. Kloihofer and M. Kampel, "Interest Point Based Tracking," 2010 20th International Conference on Pattern Recognition, 2010, pp. 3549-3552, doi: 10.1109/ICPR.2010.866.*
(Continued)

*Primary Examiner* — Li Liu
(74) *Attorney, Agent, or Firm* — Michael T. Gabrik; Frank D. Cimino (57) ABSTRACT

A method for video object detection includes detecting an object in a first video frame, and selecting a first interest point and a second interest point of the object. The first interest point is in a first region of interest located at a first corner of a box surrounding the object. The second interest point is in a second region of interest located at a second corner of the box. The second corner is diagonally opposite the first corner. A first optical flow of the first interest point and a second optical flow of the second interest point are determined. A location of the object in a second video frame is estimated by determining, in the second video frame, a location of the first interest point based on the first optical flow and a location of the second interest point based on the second optical flow.

20 Claims, 6 Drawing Sheets

(56) References Cited

U.S. PATENT DOCUMENTS

| | | |
|---|---|---|
| 2006/0227862 A1 | 10/2006 | Campbell et al. |
| 2006/0227997 A1 | 10/2006 | Au et al. |
| 2008/0042812 A1 | 2/2008 | Dunsmoir et al. |
| 2008/0152208 A1* | 6/2008 | Zahniser ............... G06V 10/507 382/133 |
| 2011/0044499 A1 | 2/2011 | Cobb |
| 2012/0143808 A1 | 6/2012 | Karins |
| 2013/0121577 A1 | 5/2013 | Wang et al. |
| 2014/0072279 A1 | 3/2014 | Maeda |
| 2014/0301602 A1 | 10/2014 | Raja |
| 2015/0178568 A1 | 5/2015 | Shellshear |
| 2016/0140394 A1 | 5/2016 | Lee |
| 2016/0267325 A1 | 9/2016 | Sundaresan |
| 2017/0053167 A1* | 2/2017 | Ren ........................... G06T 3/40 |
| 2017/0091952 A1 | 3/2017 | Sun |
| 2018/0285647 A1* | 10/2018 | Chen ..................... G06V 20/41 |
| 2019/0258878 A1* | 8/2019 | Koivisto .............. G06V 20/584 |
| 2019/0266407 A1* | 8/2019 | Gupta .................. G06K 9/6273 |
| 2019/0304102 A1* | 10/2019 | Chen ....................... G06V 10/82 |
| 2020/0250803 A1* | 8/2020 | Gu ......................... G06V 40/10 |

OTHER PUBLICATIONS

Notification of Transmittal of the International Search Report and the Written Opinion of the International Searchinf Authority, or the Declaration; dated Jun. 20, 2019; PCT/US 2019/023437; 7 pages.

Ekin T. Tekalp TM, Mehrotra R. Automatic extraction of low-level object motion description. InProceedings 2001 International Conference on Image Processing (Cat. No. 01CH37205) Oct. 7, 2001 (vol. 2, pp. 633-636). IEEE.

Extended European Search Report; Application No./Patent No. 19771604.6-1210/3769286; PCT/US2019023437: dated Apr. 23, 2021.

* cited by examiner

VIDEO OBJECT DETECTION

CROSS-REFERENCE TO RELATED APPLICATIONS

The present application is a continuation of U.S. patent application Ser. No. 16/157,861, filed Oct. 11, 2018, which claims priority to India Provisional Patent Application No. 201841010577, filed Mar. 22, 2018, entitled "Enhancing Video Object Detect Using Propagation," both which are hereby incorporated herein by reference in their entirety.

BACKGROUND

Object detection is an important problem in computer vision. In order to analyze the behavior and motion of the objects in a scene, a video processing system must be able to reliably detect the objects from video data. Detecting an object involves determining the location and scale of the object. Various analytical applications are based on determining the position and scale of the objects in the scene. For example, object detection is a necessary precursor to object tracking, since the tracker must be initialized with the location and scale of the object.

Advanced driver assistance systems (ADAS) and automated driving systems rely on object detection to determine the location of an object in a vehicles operating environment. Operations of an ADAS may include warning a driver of a detected object or assuming control of the vehicle to avoid a detected object.

SUMMARY

A vision processor includes an object detection circuit and an object propagation circuit. The object detection circuit is configured to detect an object in a first video frame. The object propagation circuit is configured to select a first interest point of the object. The first interest point is disposed in a first region of interest located at a first corner of a box surrounding the object. The object propagation circuit is also configured to select a second interest point of the object. The second interest point is disposed in a second region of interest located at a second corner of the box surrounding the object. The second corner is diagonally opposite the first corner. The object propagation circuit is further configured to determine a first optical flow for the first interest point, and determine a second optical flow for the second interest point. The object propagation circuit is yet further configured to estimate a location of the object in a second video frame by determining a location of the first interest point in the second video frame based on the first optical flow, and determining a location of the second interest point in the second video frame based on the second optical flow.

A method for video object detection includes detecting an object in a first video frame. A first interest point of the object is selected. The first interest point is disposed in a first region of interest located at a first corner of a box surrounding the object. A second interest point of the object is selected. The second interest point is disposed in a second region of interest located at a second corner of the box surrounding the object. The second corner is diagonally opposite the first corner. A first optical flow of the first interest point is determined. A second optical flow for the second interest point is determined. A location of the object in a second video frame is estimated by determining a location of the first interest point in the second video frame based on the first optical flow, and determining a location of the second interest point in the second video frame based on the second optical flow.

A video system includes a camera and a video processor. The camera is configured to capture images of an operating environment. The video processor is coupled to the camera, and is configured to receive video frames from the camera, detect an object in a first of the video frames. The video processor is also configured to define a box that surrounds the object, define a first region of interest at a first corner of the box, identify a first plurality of interest points in the first region, select a first interest point from the first plurality of interest points, and determine a first optical flow for the first interest point. The video processor is further configured to define a second region of interest at a second corner of the box, identify a second plurality of interest points in the second region, select a second interest point from the second plurality of interest points, and determine a second optical flow for the second interest point. The second corner is diagonally opposite the first corner. The video processor is yet further configured to estimate a location of the object in a second video frame by determining a location of the first interest point in the second video frame based on the first optical flow and determining a location of the second interest point in the second video frame based on the second optical flow.

BRIEF DESCRIPTION OF THE DRAWINGS

For a detailed description of various examples, reference will now be made to the accompanying drawings in which.

DETAILED DESCRIPTION

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The use of deep learning has substantially improved the detection and recognition of objects in video. However, the computational complexity required to implement deep learning makes implementation challenging on embedded devices that process video in real-time. Implementations of deep learning based object detection that are specifically directed to object detection in embedded devices, such as the single shot detector (SSD), are helpful, but still require significantly more compute capacity than is available on most embedded devices.

The video processing apparatus and methods disclosed herein provide object detection accuracy similar to that of SSD with significantly (e.g., 80×) lower computational complexity. Implementations of the invention select an interest point in each of two regions of interest associated with a detected object. The regions of interest are located at opposing vertices of a rectangle bounding the object. The optical flow of each of the interest points is determined, and the location of the object in a subsequent video frame is determined based on the optical flows of the interest points. A pool of detected objects to be propagated using optical flow is maintained. All detected objects in the pool that are younger than a selected age are propagated. Detected objects having a detection confidence score above a first confidence threshold are added to the pool. Detected objects are propagated based on optical flow if the propagated object overlaps an object detected with a detection confidence score that is below the first threshold.

Figure 1:
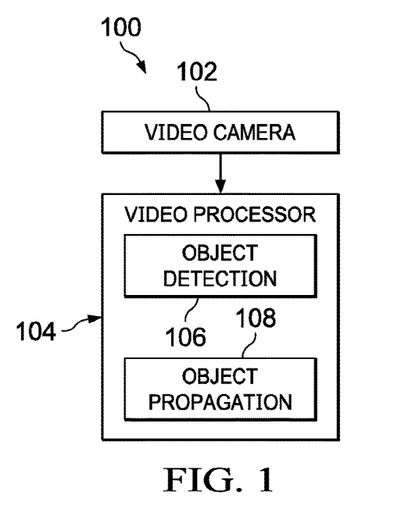
FIG. 1 shows a block diagram for an example system for processing video images in accordance with the present disclosure.

FIG. 1 shows a block diagram for an example video processing system 100 for processing video images in accordance with the present disclosure. The video processing system 100 includes one or more camera 102 and a video processor 104. The camera 102 may captures visible light or infrared images at a frame rate and resolution suitable for object detection in a particular application. For example, the video processing system 100 may be applied in an advanced driver assistance system (ADAS) or automated driving system to detect objects in the operating environment of a vehicle. In such applications, the camera 102 may operate at a frame rate of 60 frames per second, 30 frames per second, or other suitable rate with a resolution of 0.5 to 8 megapixels or higher. The camera 102 may be coupled to the video processor 104 via a camera serial interface specified by the Mobile Industry Processor Interface Alliance (e.g., MIPI CSI-2), or other interface suitable for transferring video data to a processor.

The video processor 104 is an instruction execution device suitable for detecting objects and performing other operations based on the video data received from the camera 102. For example, in an ADAS implementation the video processor 104 may be system-on-chip (SoC) of the TDA2 family produced by TEXAS INSTRUMENTS, INC. The video processor 104 may include any number and type of sub-processor. Various implementations of the video processor 104 may include one or more general-purpose microprocessor core, and/or one or more general-purpose coprocessor cores, and/or one or more digital signal processor core, and/or one or more hardware video accelerator core, and one or more vision engine core to manipulate the video date received from the camera 102 and to control the camera 102 and other components of the video processing system 100 (e.g., video display, automotive control systems, etc.). Implementations of the video processor 104 may also include memory for storage of video data for processing and instructions to be executed by the various processor cores included in the video processor 104, interfaces for accessing memory and communicating with other devices external to the video processor 104.

The video processor 104 includes an object detection circuit 106 and an object propagation circuit 108. The object detection circuit 106 and the object propagation circuit 108 may be implemented by one or more processor cores of the video processor 104 executing instructions stored in memory of the video processor 104. The object detection circuit 106 analyzes frames of video received from the camera 102 and detects objects in each frame. Each object detection is assigned a confidence value (i.e., a detection confidence score) that represents the likelihood that detected object is present in the video frame. For example a detection confidence score in a range of 0.4 to 0.6 may indicate good confidence that the detected object is present in the video frame. Examples of the object detection circuit 106 may implement SSD, Faster R-CNN (Region proposals+convolutional neural network), or other object detection architecture.

The object propagation circuit 108 estimates the location, in a current video frame, of an object detected in a previous video frame. The object propagation circuit 108 analyzes the optical flow of interest points of the object in prior video frames and propagates the object from the previous video frame to the current video frame by applying the determined optical flows to object. Implementations of the object propagation circuit 108 provide improved object detection by correlating the propagated location of an object with object detections that would otherwise remain unrecognized due to low detection confidence (e.g., a detection confidence score in a range of 0.3 to 0.5). Thus, the object propagation circuit 108 detects the presence of object in a video frame that may otherwise remain undetected, and the object propagation circuit 108 provides the improved detection with lower computational complexity than other algorithms that offer similar detection performance.

Figure 2:
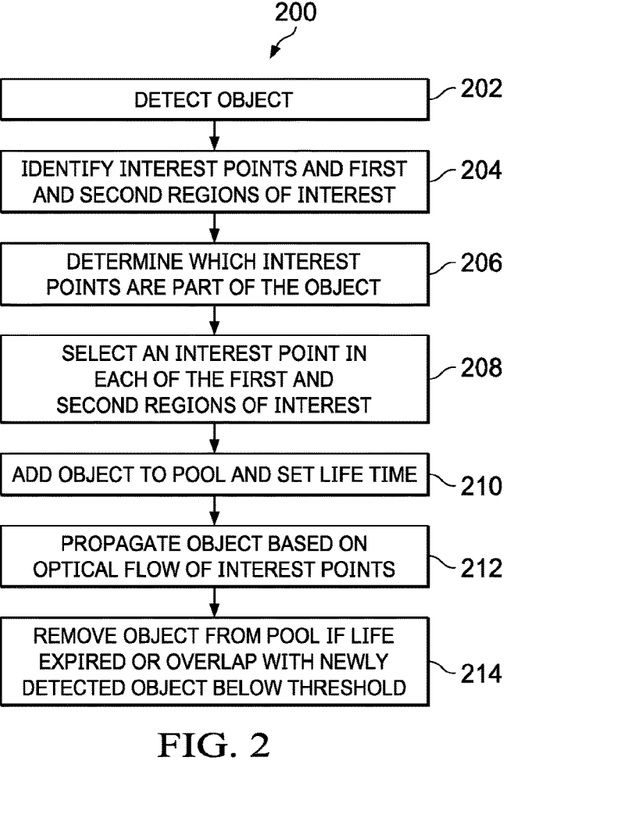
FIG. 2 shows a flow diagram for an example method for object detection in accordance with the present disclosure.

FIG. 2 shows a flow diagram for an example method 200 for object detection in accordance with the present disclosure. Though depicted sequentially as a matter of convenience, at least some of the actions shown can be performed in a different order and/or performed in parallel. Additionally, some implementations may perform only some of the actions shown. Operations of the method 200 may be performed by implementations of the video processor 104 and/or the video processing system 100.

In block 202, the camera 102 captures an image of the operating environment of the video processing system 100 in a video frame. The object detection circuit 106 processes the video frame for detection of objects.

Figure 3:
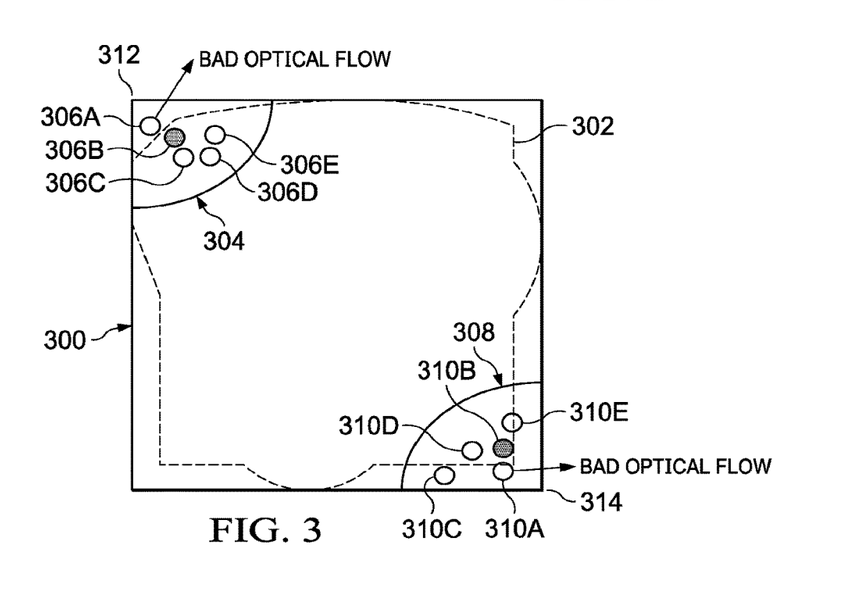
FIG. 3 shows selection of interest points based on optical flow for an object detected by a video processing system in accordance with the present disclosure.

In block 204, for each object detected by the object detection circuit 106 in the video frame, the object propagation circuit 108 identifies interest points in two regions of interest of the object. FIG. 3 shows an object 302 detected by the object detection circuit 106. The object 302 is bounded by a rectangle 300. The object propagation circuit 108 identifies an area at a first corner 312 of the rectangle 300 as a first region of interest 304 and identifies an area at a second corner 314 of the rectangle 300 as a second region of interest 308. The first corner 312 is diagonally opposite the second corner 314. Within the region of interest 304 and the region of interest 308, the object propagation circuit 108 identifies a number of interest points. The interest points may be identified by points (e.g., pixels) located on an edge or at a corner identified in the region of interest 304. For example, the object propagation circuit 108 may identify points having an edge or corner score that exceeds a threshold value as interest points. In the region of interest 304, the object propagation circuit 108 identifies interest point 306A, interest point 306B, interest point 306C, interest point 306D, and interest point 306E. In the region of interest 308, the object propagation circuit 108 identifies interest point 310A, interest point 310B, interest point 310C, interest point 310D, and interest point 310E.

Having identified multiple interest points in the regions of interest, the object propagation circuit 108 selects from the multiple interest points one of the interest points in the each of the regions of interest. To select a single interest point in each of the regions of interest, the object propagation circuit 108, determines optical flow for each of the identified points of interest. The interest points exhibiting bad optical flow are removed from consideration. For example, interest points having optical flow that takes the object out of the frame, results in occlusion of the object, etc. may be considered bad optical flow. In the region of interest 304, the interest point 306A is identified as having bad optical flow and in the region of interest 308, the interest point 310A is identified as having bad optical flow. Accordingly, the interest point 306A will not be selected as the one interest point in the region of interest 304, and the interest point 310A will not be selected as the one interest point in the region of interest 308.

Figure 4A:
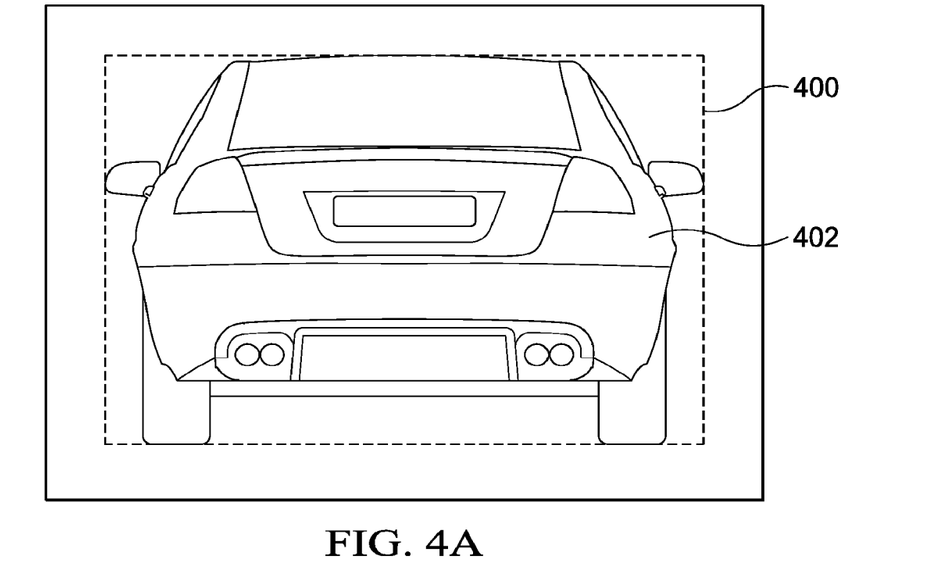
FIGS. 4A and 4B show selection of interest points based on epipolar checking for an object detected by a video processing system in accordance with the present disclosure.
Figure 4B:
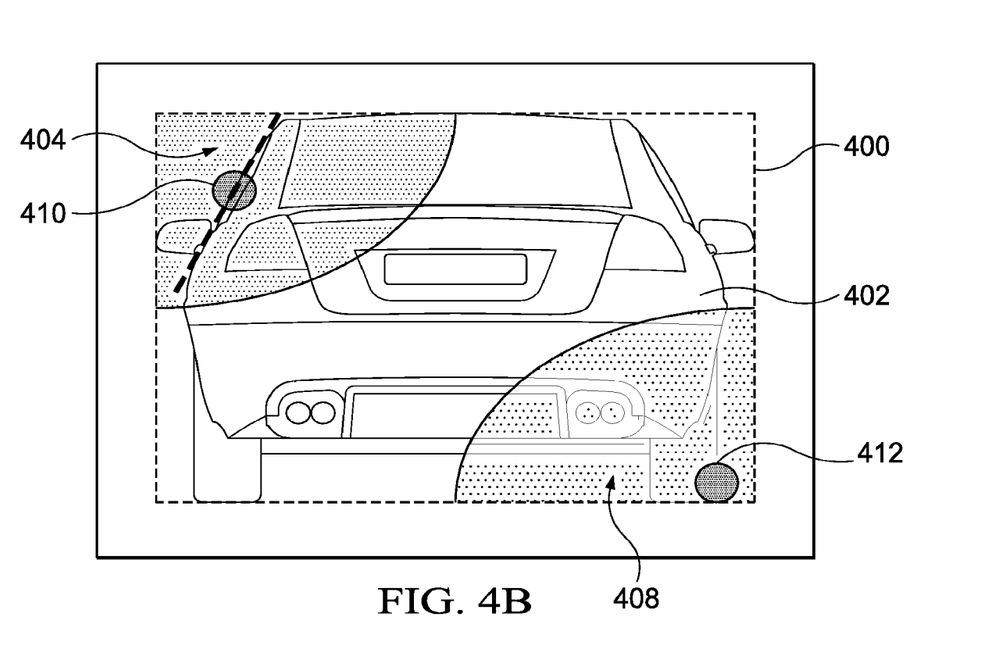

In block 206, because the rectangle 300 contains portions of the background, in addition to the object 302, the object propagation circuit 108 determines whether each of the interest points is part of the object 302 or part of the background. Interest points that are not part of the object 302 are removed from consideration as the one interest point selected in a region of interest. FIGS. 4A and 4B show a detected object 402 disposed in a rectangle 400. FIG. 4A shows that various components of the background are included within the rectangle 400, and some of those components may be indicative of an edge or corner within the region of interest 404 or the region of interest 408. For each of the interest points in the region of interest 404 and the region of interest 408, the object propagation circuit 108 performs an epi-polar check using two images captured by the camera 102 at different times. The object propagation circuit 108 computes the fundamental matrix for the object 402. Using the fundamental matrix the object propagation circuit 108 computes epipolar lines. Any interest point having optical flow that ends far (e.g., more than a threshold value) from an epipolar line is deemed part of background or a different object and is removed from consideration for selection as the one interest point in the region of interest.

In block 208, of interest points having good optical flow and that are deemed to be points of the detected object, the object propagation circuit 108 selects the interest point closed (having minimum distance) to the anchor point (i.e., closest the corner of the region of interest) to be the one interest point in the region of interest. For example, in FIG. 3, if the interest point 306B, the interest point 306C, the interest point 306D, and the interest point 306E have good optical flow and pass the epipolar check, then the object propagation circuit 108 selects interest point 306B as the one interest point for the region of interest 304 because the interest point 306B is closest to the corner 312. Similarly, if the interest point 310B, the interest point 310C, the interest point 310D, and the interest point 310E have good optical flow and pass the epipolar check, then the object propagation circuit 108 selects interest point 310B as the one interest point for the region of interest 308 because the interest point 310B is closest to the corner 314. In FIG. 4B, the object propagation circuit 108 selects the interest point 410 as the one interest point in the region of interest 404 and selects the interest point 412 as the one interest point in the region of interest 408.

Figure 5A:
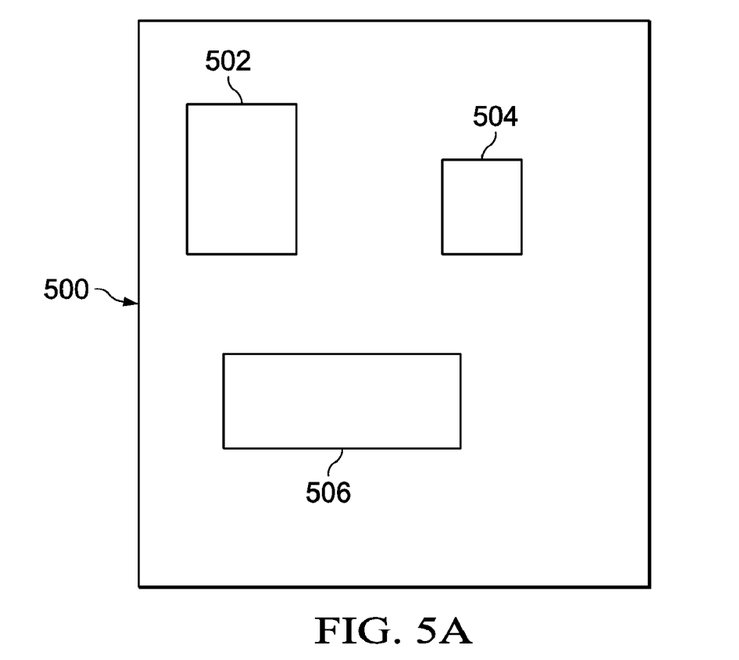
FIGS. 5A and 5B show a pool of objects being propagated by optical flow in accordance with the present disclosure.
Figure 5B:
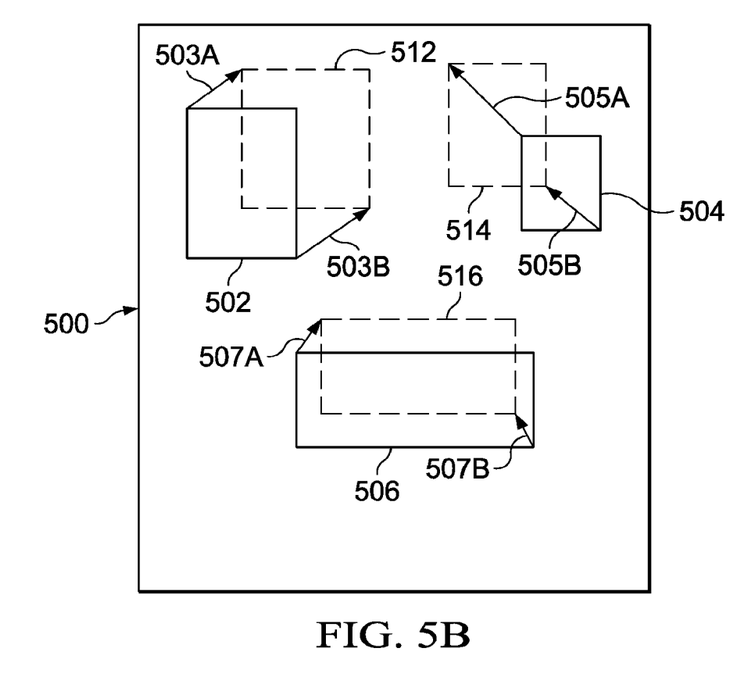

The object propagation circuit 108 maintains a pool of objects to propagate based on optical flow. In block 210, the object identified in block 202 is added to the pool. An identified object may be added to the pool if the detection confidence score assigned to the object by the object detection circuit 106 indicates good confidence that the detected object is present in the video frame. For example, if the detection confidence score assigned to object by the object detection circuit 106 exceeds a confidence threshold (e.g., a threshold in a range of 0.4 to 0.6), then the object may be added to the 500. FIGS. 5A and 5B show a pool 500 of objects being propagated by optical flow in accordance with the present disclosure. FIG. 5A shows the pool 500, where the pool 500 includes object 502, object 504, and object 506. The pool 500 may be stored in memory of the video processor 104. The pool 500 may include any number objects. As new objects are detected, the detected objects are added to the pool 500. When an object is added to the pool 500, the life time value is assigned to the object. For example, a life time of 0.5 seconds, 1 second, etc. may be assigned to each object when the object is added to the pool. At expiration of the life time, the object may be deleted from the pool 500. For the duration of the life time of an object in the pool 500, that object may be propagated (i.e., the position of the object is estimated) in each new video frame.

In block 212, the objects stored in the pool 500 are propagated. FIG. 5B shows propagation of the objects in the pool 500, in a subsequent video frame. The optical flow of the two interest points identified in each of the objects is applied to estimate the location of the object by applying the optical flow to the anchor points (i.e., the vertices of the regions of interest) of the box surrounding the object. In FIG. 5B, the object 502 is propagated to location 512 based on optical flow 503A and optical flow 503B. The object 504 is propagated to location 514 based on optical flow 505A and optical flow 505B. The object 506 is propagated to location 516 based on optical flow 507A and optical flow 507B.

In implementations of the object detection circuit 106, an object in the pool 500, may be propagated if the video processor 104 detects an object in the video frame with a moderate detection confidence score and the detected object overlaps the propagated object. A moderate detection confidence score indicates lower confidence than the good detection confidence score applied to add an object to the pool 500. For example, a good detection confidence score may be 0.4 or higher, while a moderate detection confidence score may at least 0.2 and less than 0.4.

Figure 6A:
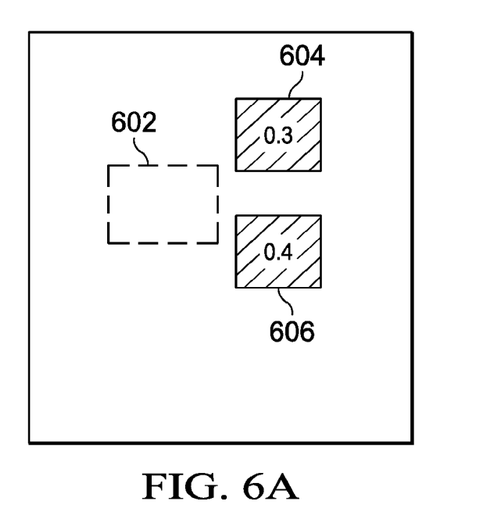
FIGS. 6A, 6B, and 6C show conditions for object propagation by optical flow in accordance with the present disclosure.
Figure 6B:
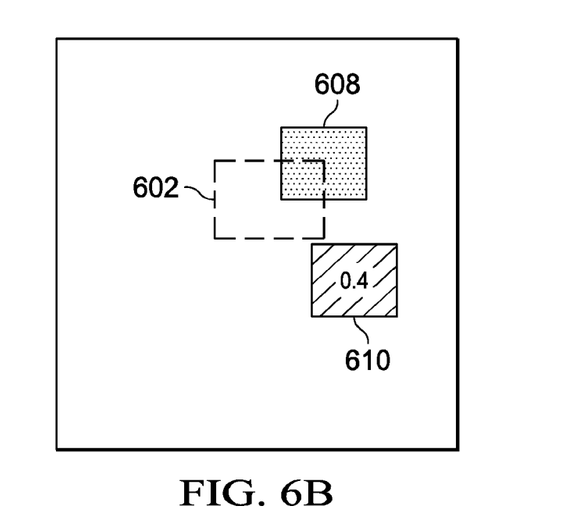
Figure 6C:
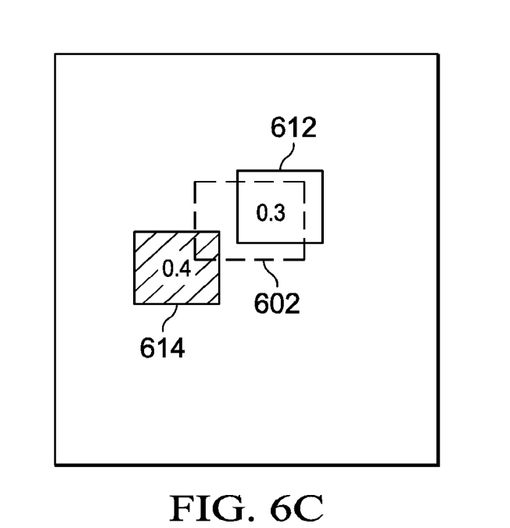

FIGS. 6A, 6B, and 6C show examples of object propagation based on overlap with newly detected objects having at least a moderate detection confidence score in accordance with the present disclosure. If a newly detected object with at least a moderate detection confidence score overlaps an estimated position of an object in the pool 500 with intersection over union (IoU) that exceeds an overlap threshold value, then the object in the pool 500 is propagated to the estimated position. In FIG. 6A, the location of the object 602 has been estimated based on the optical flows of the interest points of the object 602. Object 604 has been detected in the current frame with a detection confidence score of 0.3 (a moderate detection confidence score) and object 606 has been detected in the current frame with a detection confidence score of 0.4 (a moderate or good detection confidence score). However, because there is no overlap between the object 602 and either of the object 604 or object 606, the object propagation circuit 108 will not propagate the object 602 in the current video frame, and the object 602 may be deleted from the pool 500.

In FIG. 6B, the location of the object 602 has been estimated based on the optical flows of the interest points of the object 602. Object 608 has been detected in the current frame with a detection confidence score of 0.3 (a moderate detection confidence score) and object 610 has been detected in the current frame with a detection confidence score of 0.4 (a moderate or good detection confidence score). There is no overlap between the object 602 and the object 610, and the IoU of the object 602 and the object 608 is less than the overlap threshold value. Therefore, the object propagation circuit 108 will not propagate the object 602 in the current video frame, and the object 602 may be deleted from the pool 500.

In FIG. 6C, the location of the object 602 has been estimated based on the optical flows of the interest points of the object 602. Object 612 has been detected in the current frame with a detection confidence score of 0.3 (a moderate detection confidence score) and object 614 has been detected in the current frame with a detection confidence score of 0.4 (a moderate or good detection confidence score). The object 602 overlaps both the object 612 and the object 614. The IoU of the object 602 and the object 614 is less than the overlap threshold value, and will therefore not trigger propagation of the object 602. The IoU of the object 602 and the object 612 exceeds the overlap threshold value. Based on the overlap of the object 602 and the 612, the object propagation circuit 108 propagates the object 602 in the current video frame, and the object 602 remains in the pool 500.

In implementations of the object propagation circuit 108, object propagation based on optical flow may result in multiple detections of the same object if an object in the pool 500 is propagated and detected by the object detection circuit 106 in the current video frame. The object propagation circuit 108 applies a conditional non-maximum suppression (NMS) operation to avoid such multiple detections. If the overlap of two instances of an object is higher than a predetermined threshold (e.g., 0.5), the conditional NMS suppresses an older of two instances of the object without regard to the detection confidence scores of the two detected objects. In the object propagation circuit 108, the object propagated based on optical flow will always be older than the newly detected object, and will always be suppressed in favor of the newly detected object.

Figure 7A:
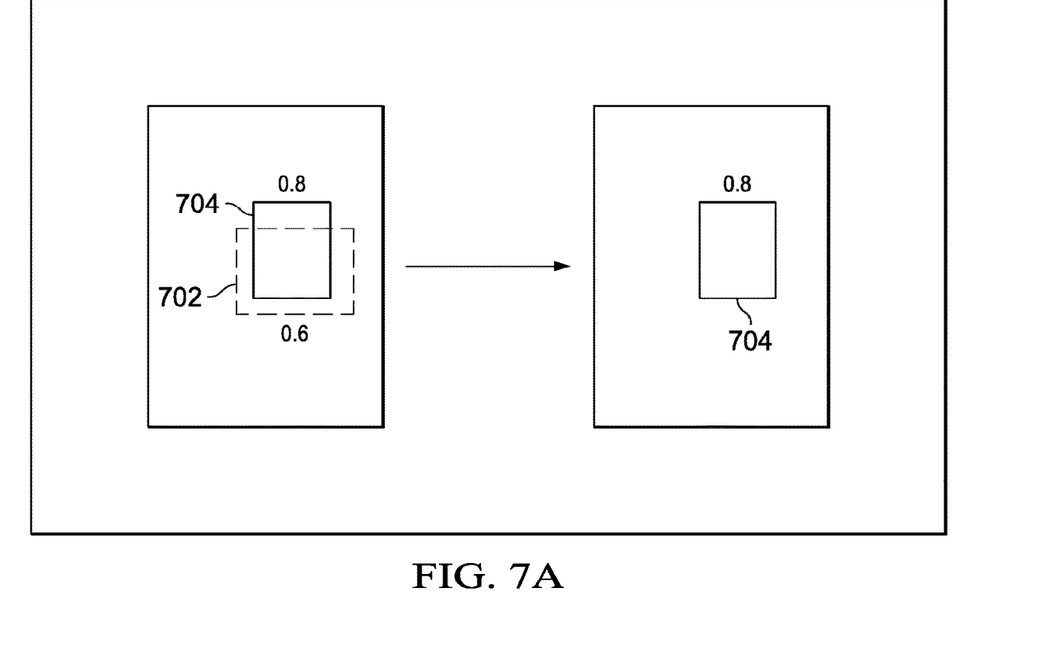
FIGS. 7A and 7B show suppression of an object propagated by optical flow based on conditional non-maximum suppression in accordance with the present disclosure.
Figure 7B:
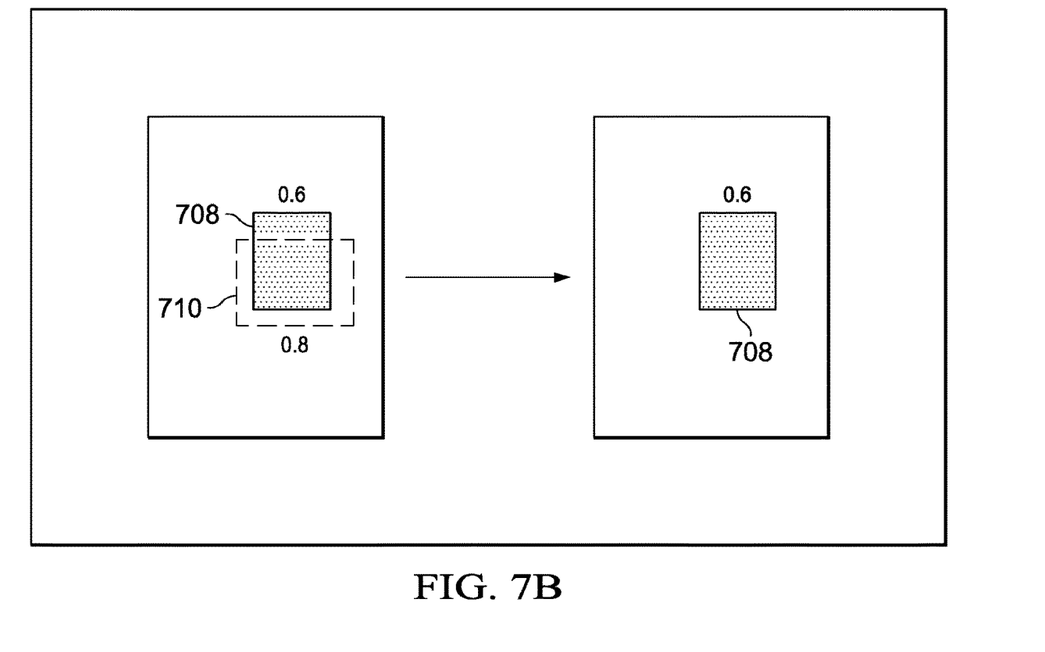

FIGS. 7A and 7B show suppression of an object propagated by optical flow based on conditional NMS in accordance with the present disclosure. In FIG. 7A, the propagated object 702 has a detection confidence score of 0.6, and the newly detected instance of the object 704 has a detection confidence score of 0.8. Because the object 702 is older than the object 704, the object propagation circuit 108 applies conditional NMS to suppress the object 702, and the object 702 may be deleted from the pool 500. Under these conditions, conditional NMS produces the same result as NMS that relies on the detection confidence scores to select which object instance is to be suppressed.

In FIG. 7B, the propagated object 710 has a detection confidence score of 0.8, and the newly detected instance of the object 708 has a detection confidence score of 0.6. The object propagation circuit 108 applies conditional NMS to suppress the object 710. While the detection confidence score of the object 708 is lower than the detection confidence score of the object 710, the object 710 is older than the object 708 which causes the object propagation circuit 108 to suppress the object 710 in favor of the object 708, and the object 710 may be deleted from the pool 500. Under these conditions, conditional NMS produces a different result from NMS that relies on the detection confidence scores to select which object instance is to be suppressed.

Returning now to FIG. 2, in block 214, the object propagation circuit 108 removes from the pool 500, objects whose life time has expired or that do not overlap with a newly detected object to at least a predetermined IoU threshold amount.

Figure 8:
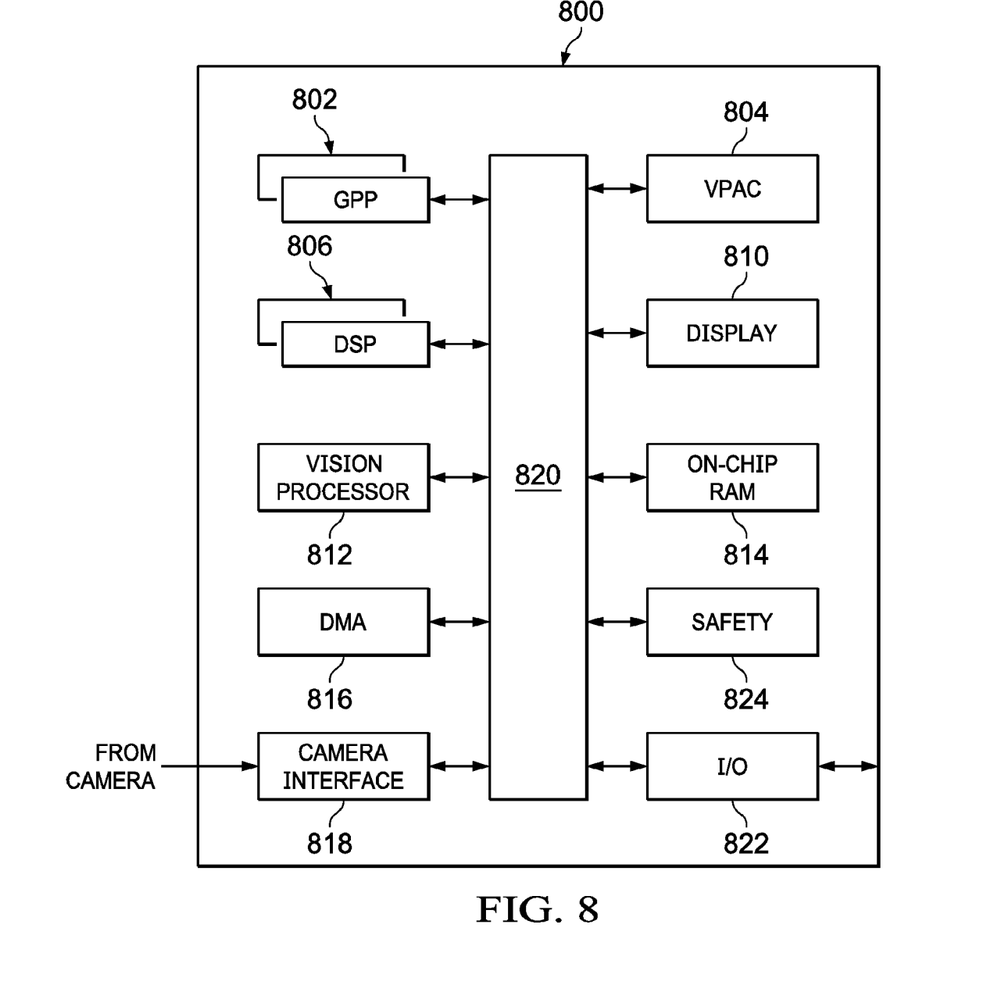
FIG. 8 shows a block diagram for an example system-on-chip suitable for implementing object propagation by optical flow in accordance with the present disclosure.

FIG. 8 shows an example of an SoC 800, which is an implementation of the processor video processor 104. The SoC 800 includes one or more general purpose processor (GPP) core 802, one or more digital signal processor (DSP) core 806, one or more vision processor core 812, and one or more processing accelerator core 804 coupled via a high speed interconnect 820. The processing accelerator core 804 includes several hardware accelerators configured to perform various processing operations on incoming images received from the camera 102. The vision processor core 812 is a vector processor tuned for computer vision processing such as gradient computation, orientation binning, histogram normalization, etc. Such computer vision processing may use the preprocessed output of the processing accelerator 804. The GPP core 802 hosts the operating system and provides overall control of the operation of the SoC 800 including scheduling of the preprocessing tasks performed by the 804. The DSP core 806 provides support for computer vision processing such as object detection and classification, object propagation, etc.

The SoC 800 further includes a DMA controller 816, a camera interface 818, a display management component 810, on-chip random access memory (RAM) 814, e.g., a computer readable medium, and various input/output (I/O) peripherals 822 all coupled to the processor cores 802, 804, 806, and 812, via the high speed interconnect 820. In addition, some implementations of the SoC 800 that are directed to automotive applications include a safety component 824 that includes safety related functionality to enable compliance with automotive safety requirements. Such functionality may include support for CRC (cyclic redundancy check) of data, clock comparator for drift detection, error signaling, windowed watch-dog timer, and self-testing of the SoC 800 for damage and failures.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A video processor, comprising:
an object detection circuit configured to detect an object in a first video frame; and
an object propagation circuit configured to:
select a first interest point of the object in the first video frame from a first plurality of interest points based on a first optical flow associated with the first interest point;
select a second interest point of the object in the first video frame from a second plurality of interest points based on a second optical flow associated with the second interest point; and estimate a location of the object in a second video frame by determining a location of the first interest point in the second video frame based on the first optical flow and determining a location of the second interest point in the second video frame based on the second optical flow.

2. The video processor of claim 1, wherein the object propagation circuit is configured to:
identify the first plurality of interest points in a first region of interest located at a corner of a quadrilateral-shaped enclosure surrounding the object;
determine whether each of the first plurality of interest points is part of the object; and
select one of the first plurality of interest points that is determined to be part of the object and is nearest to the corner to be the first interest point.

3. The video processor of claim 1, wherein the object propagation circuit is configured to:
identify the first plurality of interest points in a first region of interest;
determine a respective optical flow for each of the first plurality of interest points; and
select one of the first plurality of interest points to be the first interest point based on the respective optical flows for the first first plurality of interest points.

4. The video processor of claim 1, wherein the object propagation circuit is configured to:
maintain a pool of objects to be propagated; and
assign to each object in the pool a lifetime value during which a location of the object is estimated in each video frame.

5. The video processor of claim 4, wherein the object propagation circuit is configured to add a detected object to the pool based on a detection confidence value assigned to the detected object exceeding a first threshold.

6. The video processor of claim 4, wherein the object propagation circuit is configured to delete a detected object from the pool based on, in a given video frame, overlap of the detected object at the estimated location of the detected object and a second object detected in the given video frame being less than a predetermined overlap threshold.

7. The video processor of claim 1,
wherein the object is a first object,
wherein the object propagation circuit is configured to suppress the first object at the estimated location of the first object in the second video frame responsive to an object detected in the second frame overlapping the object by at least a predetermined amount, and
wherein a detection confidence score of the object detected in the second video frame is lower than a detection confidence score of the first object.

8. A method for video object detection, comprising:
detecting an object in a first video frame;
selecting a first interest point of the object in the first video frame from a first plurality of interest points based on a first optical flow associated with the first interest point;
selecting a second interest point of the object in the first video frame from a second plurality of interest points based on a second optical flow associated with the second interest point; and
estimating a location of the object in a second video frame by determining a location of the first interest point in the second video frame based on the first optical flow and determining a location of the second interest point in the second video frame based on the second optical flow.

9. The method of claim 8, further comprising:
identifying the first plurality of interest points in a first region of interest located at a corner of a quadrilateral-shaped enclosure surrounding the object;
determining whether each of the first plurality of interest points is part of the object; and
selecting one of the first plurality of interest points that is determined to be part of the object and is nearest to the corner to be the first interest point.

10. The method of claim 8, further comprising:
identifying the first plurality of interest points in a first region of interest;
determining a respective optical flow for each of the first plurality of interest points; and
selecting one of the first plurality of interest points to be the first interest point based on the respective optical flows for the first plurality of interest points.

11. The method of claim 8, further comprising:
maintaining a pool of objects to be propagated; and
assigning to each object in the pool a lifetime value during which a location of the object is estimated in each video frame.

12. The method of claim 11, further comprising adding a detected object to the pool based on a detection confidence value assigned to the detected object exceeding a first threshold.

13. The method of claim 11, further comprising deleting a detected object from the pool based on, in a given video frame, overlap of the detected object at the estimated location of the detected object and a second object detected in the given video frame being less than a predetermined overlap threshold.

14. The method of claim 8, wherein the object is a first object, and the method further comprises suppressing the first object at the estimated location of the first object in the second video frame responsive to an object detected in the second frame overlapping the object by at least a predetermined amount; wherein a detection confidence score of the object detected in the second frame is lower than a detection confidence score of the first object.

15. A video system, comprising:
a camera configured to capture images of an operating environment;
a video processor coupled to the camera, the video processor configured to:
receive a first video frame and a second video frame from the camera;
detect an object in the first video frame;
define a perimeter that surrounds the object;
define a first region of interest in the perimeter;
select a first interest point among a first plurality of interest points in the first region based on a first optical flow associated with the first interest point;
define a second region of interest in the perimeter;
select a second interest point among a second plurality of interest points in the second region based on a second optical flow associated with the second interest point; and
estimate a location of the object in the second video frame by determining a location of the first interest point in the second video frame based on the first optical flow and determining a location of the second interest point in the second video frame based on the second optical flow.

16. The video system of claim 15, wherein the perimeter is in the shape of a quadrilateral, and the first region is located at a first corner of the box, wherein the second region is located at a second corner of the box, and wherein the video processor is configured to:
- determine whether each interest point of the first plurality of interest points in the first region is part of the object by performing an epi-polar check; and
- select an interest point of the first plurality of interest points that is part of the object and nearest to the first corner of the box to be the first interest point;
- determine whether each interest point of the second plurality of interest points in the second region is part of the object by performing an epi-polar check; and
- select an interest point of the second plurality of interest points that is part of the object and nearest to the second corner of the box to be the second interest point.

17. The video system of claim 15, wherein the video processor is configured to:
- maintain a pool of objects to be propagated; and
- assign to each object in the pool a lifetime value during which a location of the object is estimated in each video frame.

18. The video system of claim 17, wherein the video processor is configured to add a detected object to the pool based on a detection confidence value assigned to the detected object exceeding a first threshold.

19. The video system of claim 17, wherein the video processor is configured to delete a detected object from the pool based on, in a given video frame, overlap of the detected object at the estimated location of the detected object and a second object detected in the given video frame being less than a predetermined overlap threshold.

20. The video system of claim 15,
wherein the object is a first object,
wherein the video processor is configured to suppress the first object at the estimated location of the first object in the second video frame responsive to a second object detected in the second video frame overlapping the first object by at least a predetermined amount, and
wherein a detection confidence score of the object detected in the second video frame is lower than a detection confidence score of the first object.

* * * * *